June 24, 1941.    M. J. JOHNSON    2,246,884
POTENTIOMETER
Filed Sept. 22, 1938    2 Sheets-Sheet 1
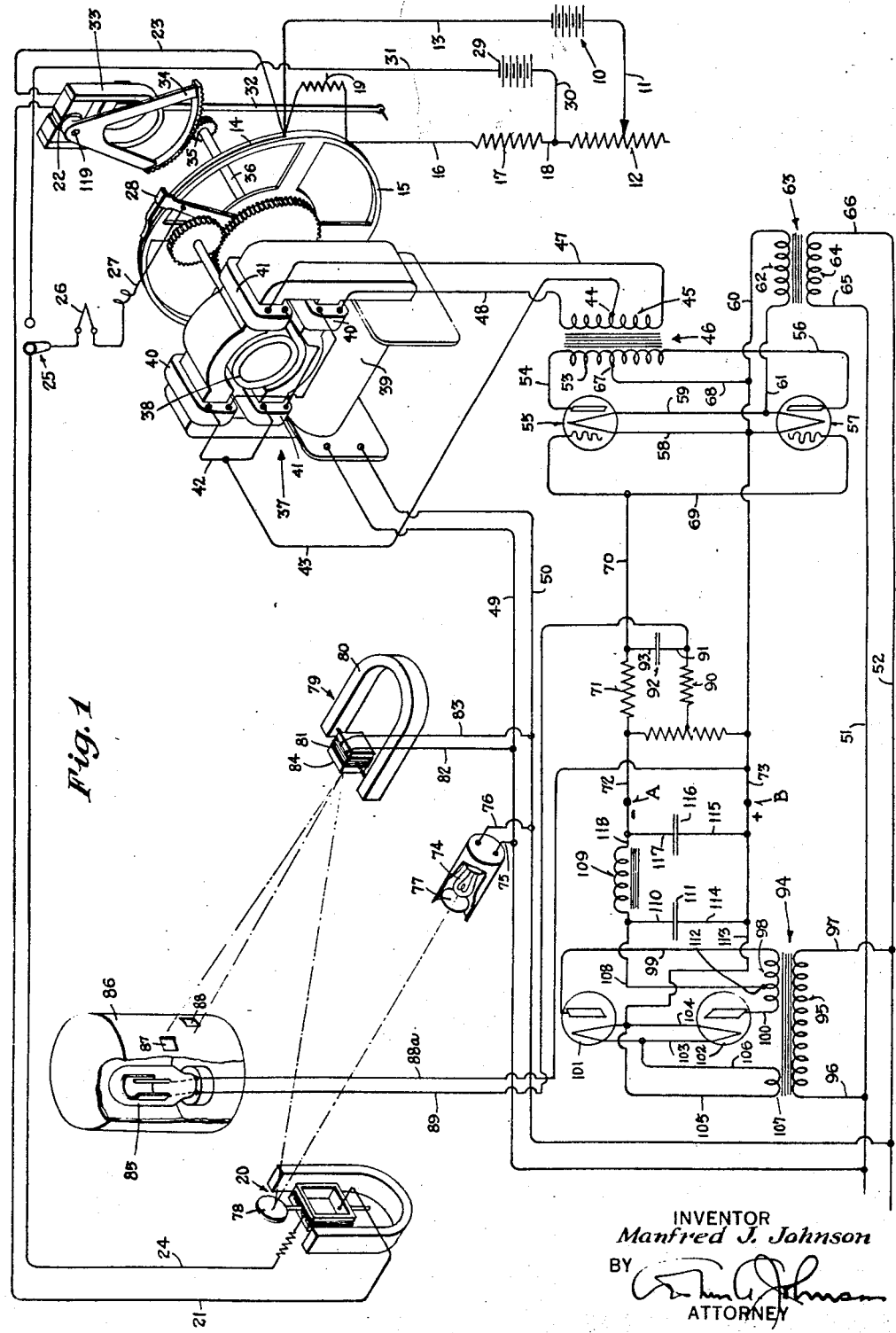
INVENTOR
*Manfred J. Johnson*
BY
ATTORNEY June 24, 1941.  M. J. JOHNSON  2,246,884
POTENTIOMETER
Filed Sept. 22, 1938  2 Sheets-Sheet 2
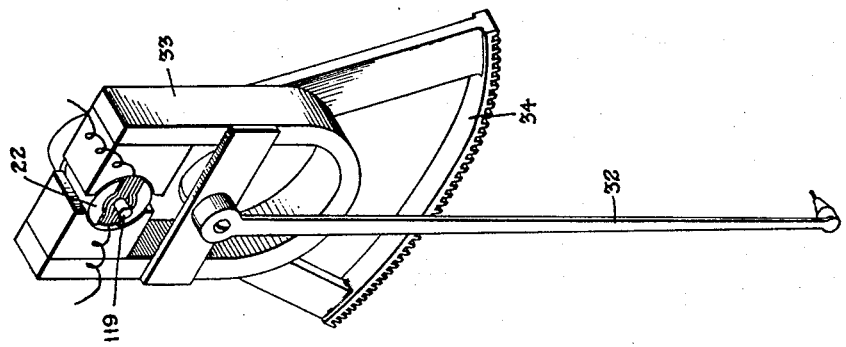
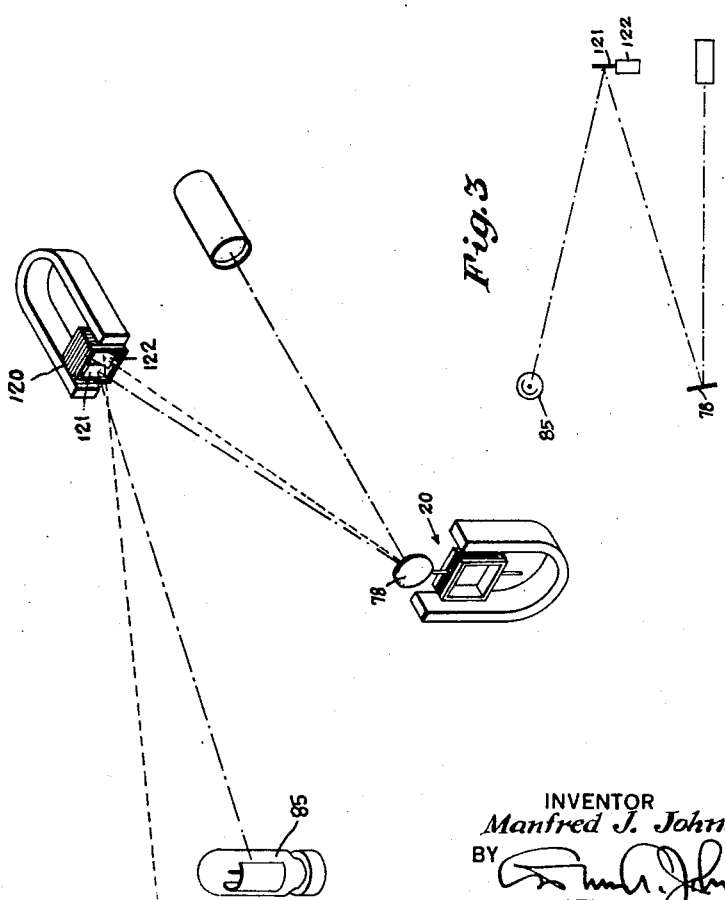
INVENTOR
Manfred J. Johnson
BY
ATTORNEY Patented June 24, 1941

2,246,884

UNITED STATES PATENT OFFICE 2,246,884

POTENTIOMETER

Manfred J. Johnson, Naugatuck, Conn., assignor of one-half to The Lewis Engineering Company, Naugatuck, Conn.

Application September 22, 1938, Serial No. 231,277

15 Claims. (Cl. 250—41.5)

This invention relates to controls for potentiometer systems and the like, and, more particularly, to a continuous balancing control potentiometer for indicating and recording unknown quantities such as temperature.

An object of this invention is to provide an improved control for recording potentiometers and the like which is particularly quick acting and accurate and which can be made very small and compact with economy of manufacture. In carrying out the above object, the present invention provides with a potentiometer circuit a continuously balancing control apparatus utilizing solely one photosensitive cell and a light beam, the latter being shifted by a small mirror carried by a galvanometer.

In my application, Serial No. 72,670, filed April 3, 1936, now Patent No. 2,151,474, I have disclosed the use of a reversible shaded pole A. C. induction motor for adjusting the slide wire pointer, ruling pin or other device of the potentiometer circuit, while, at the same time, employing thermionic devices to control the motor. In this prior application, the grids of the thermionic devices are controlled according to the directional movements of the galvanometer by using only one light-sensitive cell and a beam of light, which latter is directed by the movements of the galvanometer and by periodically interrupting said beam of light by a shutter device synchronized with the impulses which energize the thermionic devices. This means, although it obviated the step-by-step adjustment of the reversible shaded pole motor of the previously proposed systems and provided a continuously balancing control which enabled a much quicker and more accurate adjustment of the potentiometer circuit to be made, nevertheless, presented several difficulties which are obviatd by the present invention. The method disclosed by the prior application required the employment of numerous moving parts requiring lubrication, and whose mechanical efficiency was impaired due to friction and subsequent wear of the moving parts.

In carrying out the present invention, the light beam falling on the photo cell is synchronized by a vibrating or oscillating unit having a movement very similar to that of a D'Arsonval galvanometer comprising a moving coil which is connected to the source of alternating current voltage and carries a reflecting means, which is adapted to reflect the light, which is directed by the movement of the mirror of the galvanometer. The moving coil, as it is connected to the source of alternating current voltage, will oscillate in step with the alternating current wave, and, consequently, the movement of the coil will be synchronized with the impulses which energize the thermionic devices. The beam of light controlled by the oscillating unit as the same impinges against the photo cell, will excite the same so as to cause to function either of the thermionic devices employed depending upon whichever device is in condition to function as determined by its plate energization at that time.

The thermionic devices are so connected with the photoelectric cell that impulses from the latter can affect equally the charge on both the grids of the devices, and the plates of these devices are energizd through transformer coupling from the shading coils of the A. C. motor in such a manner that, at any instant, except for zero polarity, the plates will be oppositely charged or will be in phase opposition.

It will be seen that only when the plate of a thermionic device has a positive charge is that device in condition to function, and, therefore, according to the above circuit, in order to have only one particular device function for a given period of time, proper charges are impressed on the grids of the devices only during the interval when the plate of a particular device is positive.

In the preferred form of the present invention, I provide a shield interposed between the photosensitive cell and the vibrating unit, which is provided with apertures displaced in such a manner as to occupy the positions of the positive and negative cycle of the alternating current waves. The apertures of the shield, as each are illuminated by the oscillating beam, allow the passage of light onto the photosensitive cell, and, by reason of their displacement, cause the photo cell output to be in time with either the positive or the negative half cycle of the wave.

The portion of the shield intermediate the two apertures therein is adapted to shut off the light completely for zero or no deflection position of the galvanometer. The light which reaches the photoelectric cell is, therefore, timed by means of the vibrating unit and apertures of the shield so as to cause periodic charges to be impressed on the grids of the thermionic devices such that that device will function, which causes movement of the motor controlling the slide wire in a direction to balance the potentiometer circuit and to thereby cause subsequent return of the galvanometer to zero position.

In accomplishing this control as embodied in the potentiometer system, the vibrator is synchronized with the alternating current energization of the thermionic devices so that for a given direction of deflection of the galvanometer the light striking the photosensitive cell will be so synchronized that either the positive or negative half cycle of the wave will be in time with the cell and the condition of one particular thermionic device.

The cell, as its illumination is controlled by the vibrator which is operated by the same source of alternating current as the thermionic devices, and as one particular thermionic device when the aperture of the shield is illuminated which correspond to the positive cycle of the wave, will have its plate positively charged, that device will, therefore, be in a condition to function. This device in functioning causes a loading of one set of shading coils of the motor, and this loading results in rotation of said motor in one direction. When the galvanometer deflects in the opposite direction, the light striking the photo cell will be so timed by means of the vibrating unit as to cause to function the other thermionic device, resulting in a loading of the other pair of shading coils of the motor and consequent movement of the latter in the opposite direction.

When the potentiometer circuit is in a balanced condition, there will be obviously no deflection of the galvanometer, and the beam of light, which is reflected from the mirror carried thereby to the mirror of the vibrating unit, will be prevented from striking the photosensitive cell by the light obstructing portion of the shield intermediate the apertures, and, therefore, since no impulses will be impressed on the grids of the thermionic devices, these will not function and the motor and the attached slide wire will remain at rest.

The shield may be dispensed with, if desired, and the single mirror of the vibrating unit displaced by a pair of angularly disposed mirrors so positioned as to cause the light to strike the photosensitive cell at properly timed intervals.

In this form of the invention with zero deflection of the galvanometer due to the angular disposition of the mirrors, the light will be directed around the cell and energization of the same is thereby prevented.

It will thus be seen that the present invention provides, by means of a solely one photosensitive cell and a synchronized vibration device oscillating a light beam, a continuously balanced exceptionally quick acting and sensitive control having but a minimum of moving parts for potentiometer circuits or other systems.

In recording systems, however, where the galvanometer is at all times free and where balancing is restored by the movement of a secondary device, such as a reversible motor, it is difficult to obtain high speed recording due to the time lag necessary for the mechanism as a whole to attain equilibrium.

According to the present invention, means are employed which assist the mechanism as a whole to obtain equilibrium, and which comprises, in the broader aspects of the invention, an anticipating device to assist in overcoming the inertia of the moving parts of the balancing motor as well as that of the galvanometer.

Accordingly, this device supplies an advancing counter E. M. F. to the galvanometer, which E. M. F. is proportional in its magnitude to the function of the speed to which the motor moves and the direction of which is dependent upon the direction of the movement of the motor. The introduction of the counter E. M. F., caused by the movement of the motor, overcomes the inertia of the moving parts, and obviates the time lag heretofore necessary for the instrument to attain equilibrium.

Other feautres and advantages will hereinafter appear.

In the accompanying drawings:

Figure 1 is a schematic view showing the single source of light, galvanometer, synchronized vibration unit, and photosensitive cell in their approximate physical relationship, and also a diagrammatic representation of the circuits and apparatus associated therewith.

Fig. 2 shows a modified form of the synchronous vibration unit and its approximate physical relationship with the light source, galvanometer, and photosensitive cell.

Fig. 3 is a plan view somewhat diagrammatic of the mechanism illustrated in Fig. 2.

Fig. 4 is a front perspective view of the device employed to assist the mechanism as a whole to attain equilibrium.

In the preferred form of the invention, referring now to the system diagrammatically shown in Fig. 1, the potentiometer circuit which is used with the thermocouple or other source of voltage varied according to a change of condition includes a primary source of energy in the form of a battery 10 which is connected by means of a wire 11 to a variable calibrating resistance 12, and by means of a wire 13 to one end of a slide wire 14 mounted on the periphery of a stationary disk 15. The other end of the slide wire 14 is connected by a wire 16 to a resistor 17 which in turn is connected by a wire 18 to the other end of the calibrating resistance 12. A resistor 19 is shunted across the slide wire 14 for the purpose of reducing the voltage drop across the latter. A complete circuit is thus formed through the slide wire 14, shunted resistance 19, the resistor 17, the calibrating resistance 12 and the battery 10.

A galvanometer 20 is attached by means of a wire 21, an armature 22, the purpose of which will be hereinafter more fully explained, and wire 23 to one end of the slide wire 14 by means of a wire 24, through a switch 25, to a thermocouple 26 which, in turn, is connected by a wire 27 to a movable contact 28 which moves around the disk 15 and contacts with the slide wire 14.

Thus, the galvanometer 20 and the thermocouple 26 are shunted across a portion of the slide wire 14 as determined by the position of the movable contact 28, and it is possible, by adjustment of said contact and the calibrating resistance 12, to secure a balanced condition such that no deflection of the galvanometer results. For the purpose of checking the potential drop across the slide wire 14 of the potentiometer circuit, just described, a standard cell 29 is connected by means of a wire 30 to the wire 18, and by means of a wire 31 to an alternative contact of the switch 25.

It will be readily understood that, for a condition of no deflection of the galvanometer 20, the movable contact 28 may have various positions, these positions corresponding to various temperatures to which the thermocouple 26 is subjected. A pointer 32 has one end rigidly secured to a permanent magnet 33 which in turn is rigidly connected to a gear segment 34 in mesh with a gear 35 carried by the shaft 36. The shaft is attached to the movable contact 28, and, therefore, various positions of the pointer 32 may be made to indicate various temperatures of the thermocouple 26.

I have disclosed in my application, Serial No. 35,151, filed August 7, 1935, now Patent No. 2,109,776, issued March 1, 1938, the use of a reversible shaded pole alternating current motor, controlled by thermionic devices which in turn were under the control of movements of the galvanometer, the motor being employed to move the contact of the potentiometer system.

The system, diagrammatically illustrated in Fig. 1, employs a similar induction motor 37 under the control of similar thermionic devices, said motor having a squirrel cage rotator 38 and a continuously energized A. C. field 39. The motor 37 has a pair of oppositely disposed shading poles 40 connected in series and a second pair of oppositely disposed shading poles 41 also connected in series. The shading poles 40 and 41 are so disposed on the pole pieces of the motor that loading of one set of shading coils will cause rotation of the motor in one direction and the loading of the other set of shading coils will cause rotation of the motor in the other direction.

One end of the series connected coils 40 is joined by means of a wire 42 to one end of the series connected coils 41 and this juncture is connected by means of a wire 43 to the center tap 44 of the primary winding 45 of a transformer 46. One end of the primary winding 45 is connected by a wire 47 to the remaining end of the series connected shading coils 41, and the other end of the primary winding 45 is connected by means of a wire 48 to the remaining end of the series connected coils 40.

The transformer 46 is used to couple the plates of thermionic devices to the shading coils as hereinafter disclosed. By virtue of the standard A. C. energization of the field 39 of the motor, there will be voltages induced in the shading coils 40 and 41 thereof, and these voltages will be impressed on the primary winding 45 of the transformer 46 and will result in a continuous energization of the transformer, which energization is of the same frequency as that of the field 39, and has a definite phase relationship thereto.

The field 39 of the motor is connected by wires 49 and 50 to main A. C. supply wires 51 and 52 and, therefore, the energization of the transformer 46 has a definite phase relationship with the energy carried by these supply wires.

The transformer 46 has a secondary coil 53 having one end connected by a wire 54 to the plate or anode of a thermionic device 55, and having the other end connected by a wire 56 to the plate or anode of a second thermionic device 57. The thermionic devices 55 and 57 are of the three electrode types, each having a filament, a grid and a plate.

It will be understood that there is thus impressed on the plates of the thermionic devices 55 and 57 an alternating voltage from the transformer 46, and, at any instant the polarity of one plate will be opposite to the polarity of the other plate, and the charges thereon will alternate in phase with the energy of the supply wires 51 and 52. The filaments of the thermionic devices 55 and 57 are connected in parallel by wires 58 and 59, and these latter are respectively connected by wires 60 and 61 to the secondary 62 of a filament supply transformer 63, the primary 64 of which is connected by wires 65 and 66 to the supply wires 51 and 52. The secondary 53 of the transformer 46 has a center tap 67 which is connected by a wire 68 to the wire 60 which leads from the filament transformer 63, and, therefore, the charges impressed on the plates of the thermionic devices 55 and 57 are measured substantially with reference to the filaments of these devices.

The grids of the thermionic devices 55 and 57 are connected together by a wire 69, and this wire is connected through a wire 70 and a suitable grid resistor 71 and a wire 72 to the point A representing the negative side of a suitable source of direct current energy supply to be hereinafter described. The positive side of the source of D. C. energy, as designated by point B, is connected by a wire 73 to the common connector 58 of the filaments of the thermionic devices, and, therefore, the grids of said devices have impressed on them a negative charge with respect to the filaments, the magnitude of which charge is sufficient to limit the plate currents to a relatively small value.

It may be seen that by impressing at properly timed intervals, the suitable positive charge on the grids of the thermionic devices 55 and 57, that device which has its plate positive during said intervals will be made to function and will, through the transformer coupling means, load its associated shading coils of the motor and cause rotation thereof.

Functioning of the thermionic device 55 will cause rotation of the motor in the one direction, and the functioning of the other device 57 will cause rotation of the motor in the opposite direction.

The means for controlling rotation of the motor directionally in accordance with the direction of deflection of a deflectable member includes means for causing the thermionic devices 55 and 57 to function, using solely one photosensitive cell by impressing charges on the grids of these devices in accordance with the off-zero movements of the galvanometer 20, such that deflection of the galvanometer in one direction will cause to function one of the thermionic devices, and deflection of the galvanometer in the other direction will cause to function the other of the thermionic devices.

To this end, there is provided a novel form of control including a beam of light reflected by a mirror attached to the galvanometer and reflected through a synchronous vibrating unit including a mirror onto a photosensitive cell which is in circuit with the grids of the thermionic devices.

In the embodiment of Fig. 1, there is provided a light source 74 which is preferably in the form of an incandescent bulb connected by wires 75 and 76, through wires 49 and 50, to the supply wires 51 and 52. The source of light 74 has a lens 77 associated therewith for directing a beam of light against the mirror 78 attached to the coil of the galvanometer 20, and the light 74 and mirror 78 are so disposed that the beam of light reflected by the mirror 78 is directed to a vibrating unit 79 comprising a permanent magnet 80 having a moving coil 81 disposed between the poles thereof, which coil is connected by means of wires 82 and 83 to the wires 49 and 50, which in turn are connected to the supply wires 51 and 52. The moving coil 81 carries a small mirror 84, and the vibrating unit 79 is so disposed that the beam of light reflected by the mirror 78 of the galvanometer 20 will be directed by the mirror 84 toward a photosensitive cell 85 of the emission type. The moving coil 81, which is connected to the supply wires 51 and 52, as previously explained, will oscillate in step with the alternating current wave, and in so doing, will cause the mirror carried thereby to reflect the light in a form of a ribbon.

The photosensitive cell 85 is housed or screened by a casing 86 provided with two substantially small spaced apertures 87 and 88 which are so disposed as to occupy the positions of the positive and negative cycle of the alternating current wave. It will thus be seen that, if either of the apertures are illuminated by the oscillating beam, either the positive or negative half cycle of the wave will be in time with the photosensitive cell 85.

The photosensitive cell 85 has one terminal connected by wire 88a to the wire 73 which joins to the common filament connection of the thermionic devices, and has the other terminal connected by wire 89 to a resistor 90 and through a wire 91 to the grid condenser 92. The condenser 92 has its remaining terminal connected by a wire 93 to the wire 70 which is joined with the grid resistor 71, and the remaining terminal of the resistor 90 is connected across the wires 72 and 73 of the direct current supply. By so connecting the photosensitive cell 85 in the grid circuits of the thermionic devices 55 and 57, light in striking said cell will cause a charge therefrom which will have the effect of reducing the negative polarity of the grids, and in some cases, even resulting in grids of zero or slightly positive polarity. From the academic viewpoint, a steady light, in striking the photosensitive cell 85, will so affect the grids that the thermionic devices 55 and 57 will function whenever their plates are positively charged, and since these latter are in phase opposition, one device will begin to function as soon as the other device has stopped functioning, the devices alternately functioning in step with the alternations of the plate charges.

However, for the practical purposes of this invention, the present invention provides for oscillating the beam of light from the galvanometer 20 to the photosensitive cell 85 by means of the synchronized vibrating device 79 in such a manner that light will strike the cell at properly timed intervals so as to cause to function only one of the thermionic devices. The particular device which will be caused to function, being according to the direction of deflection of the galvanometer, and for zero deflection of the galvanometer, the light, as explained, will be completely cut off from the cell. Thus, if the galvanometer is deflected to the left, light will strike the photosensitive cell only at those times during which a positively charged plate exists in that thermionic device which, when functioning, loads the shading coils of the motor so as to move the contact 28 in the direction required to lessen the left deflection of the galvanometer. It follows, therefore, that a right deflection of the galvanometer would as a consequence make the photosensitive cell cause to function the other thermionic device which causes the motor to rotate the contact 28 so as to lessen the right deflection of the galvanometer. Thus, there is effected a balancing of the potentiometer circuit, and it is to be noted that frequency of oscillation of the light beam is sufficiently high so that the movement of the motor in balancing the circuit is not a step-by-step movement, but is of a substantially continuous nature.

The apertures 87 and 88 are so disposed with respect to the shield 86 that the aperture 87 will permit light from the galvanometer, when deflected to the left, to stroke the photosensitive cell 85 only during those periods when the plate of one of the thermionic devices is positive and, therefore, when that device is in condition to function so as to cause rotation of the motor 37 and that thermionic device is chosen which will cause the contact 28 to move in a direction which will reduce the left deflection of the galvanometer. Therefore, the aperture 88 of the shield 86 will permit light from the galvanometer mirror, when deflected to the right, to strike the photosensitive cell only during those periods when the other of the thermionic devices is in a position to function by virtue of its plate being positive and to cause a movement of the contact 28 such that the right deflection of the galvanometer will be lessened. Of course, for a balanced contact of the potentiometer circuit and zero position of the galvanometer, light from the mirror attached thereto will be prevented from striking the photosensitive cell 85 because of the obstruction offered to it by the imperforate portion of the shield 86 intermediate the apertures 87 and 88.

It will be understood that as the light beam is deflected from its neutral position, it will gradually be moved into one or the other of the openings. As it is moved into the opening, it will gradually change the potential on the grid. For small changes in the condition which are in the nature of 5° on a 2,000° scale, the motor will not reach full speed, but will creep slowly in the desired direction. However, for greater changes in the condition, the light beam will be moved into a position in which it will illuminate the cell through the proper aperture sufficiently to cause the motor to be run at full speed. Inasmuch as changes in the condition are usually greater than that required to produce the 5° deflection, it will be seen that the motor will normally run at full speed until the balance is approached to the extent that there remains only a difference in potential equivalent to a 5° deflection on a 2,000° scale, at which time the motor will begin to gradually slow down and stop when absolute balance is approached.

In order to maintain the grids of the thermionic devices normally negative, there is shown in Fig. 1, a conventional full-wave rectifier and filter receiving energy from the main supply wires and having its negative side connected at (A) to the wires 72, and its positive side connected at (B) to the wire 73. This direct current supply for the grid circuit includes a transformer 94 having a primary winding 95 connected by wires 96 and 97 to the supply wires 51 and 52, and having a secondary winding 98 having its ends connected by wires 99 and 100 to the anodes or plates of rectifier tubes 101 and 102. The filaments of the tubes 101 and 102 are connected in parallel by wires 103 and 104 which are joined respectively by wires 105 and 106 to a filament winding 107 of the transformer 94. The juncture of the wires 104 and 105 is connected by a wire 113 to the wire 73 of the filament circuit. The secondary 98 of the transformer 95 has a center tap 112 connected by a wire 108 to a choke coil 109 and through a wire 110 to a filter condenser 111. The remaining terminal of the condenser 111 is connected by a wire 114 to the wire 113 and this latter is also connected by a wire 15 to a second filter condenser 116 which has its remaining terminal connected through a wire 117 to the choke coil 109.

The wire 118 connects the choke coil 109 with the wire 72 of the grid circuit. There is thus provided a means for maintaining the grids of the thermionic devices 55 and 57 at a negative potential with respect to the filaments thereof so that said devices are normally inoperative due to limited or no plate current. It should be understood that any other suitable source or supply of direct current energy such as a battery may be connected between the points (A) and (B) in place of the rectifier and filter just described.

In use, although the control for the potentiometer is quick acting and accurate, it has been found difficult to attain high speed recording due to the elapse of time necessary for the mechanism as a whole to obtain equilibrium. The inertia of the moving parts of the balancing motor, as well as the fact that the galvanometer having some weight of moving parts coupled with a low torque has a definite time constant of its own, causes a certain time lag before the mechanism as a whole attains equilibrium. Consequently, equilibrium could never be attained unless the whole recording system was slowed down to a point where the inertia of moving parts became negligible.

To permit extremely fast recordings without overshooting, the present invention provides means for assisting the mechanism to attain equilibrium, and comprises, in the broader aspects of the invention, an anticipating device to assist in overcoming the inertia of the moving parts of the balancing motor as well as that of the galvanometer.

According to the present invention, this device supplies an advancing counter E. M. F. to the galvanometer, which E. M. F. is proportional in its magnitude to the speed with which the pointer moves and its direction is dependent upon the direction of the movement of the pointer. As the direction, speed and magnitude of the movement of the pointer are controlled by the motor, the anticipating device of the present invention is actually controlled by the motor and may be, if desired, operated directly or through a suitable train of gears from the motor shaft.

In the now preferred form of the invention, referring now to Fig. 4, the pointer 32, as previously explained, has one end thereof rigidly secured to the permanent magnet 33 which forms together with the armature 22 a small current generator. The winding of the armature 22 is connected in series with the thermocouple or other unknown source to be measured, and the armature and its windings are rigidly secured to a shaft 119. The pointer 32, in the now preferred embodiment of the invention, is permanently connected to the magnet 33, and the magnet in turn is permanently secured to the gear segment 34 in mesh with gear 35 carried by the shaft 36 which moves the contact 28. It will be seen that all connections are rigid and permanent, obviating the use of all sliding contacts and subsequent wear of contacting surfaces.

The magnet 33, carrying the gear segment 34 and pointer 32, will move as a unit upon rotation of the shaft 35, about the shaft 119, and it will be seen, that for any motion of the shaft 36, a definite E. M. F. is generated. As will be understood, the faster the rotative movement of the shaft 36, and consequently the pointer 32, the greater will be the quantity of E. M. F. generated by the generator comprising the magnet 33 and armature 22.

It will also be apparent that the direction of the E. M. F. generated will be determined by the movement of the shaft 36 so for practical purposes it can be said that the direction of E. M. F. generated will depend upon whether the pointer 32 moves up scale and down scale.

By the introduction of the counter E. M. F. to the potentiometer circuit, as above described, as soon as the pointer starts to move, movement of the mechanism as a whole is, therefore, anticipated. The introduction of the advancing E. M. F., caused by movement of the shaft 36, assists the mechanism as a whole to attain equilibrium by overcoming the inertia of the moving parts and obviates the time lag heretofore necessary before the instrument actually attained equilibrium. It will be seen that the introduction of the advancing counter E. M. F., as soon as the pointer 32 starts to move, will tend to bring the light spot on the neutral zone between the apertures 87 and 88 before it actually arrives there by normal balancing, thereby slowing down the balancing action.

For large deflections which will cause the galvanometer to be moved its maximum distance and against its stop, the cell will be illuminated to cause the motor to run at full speed. The voltage in the thermocouple circuit to produce such a deflection will be of such a magnitude that the advancing E. M. F. generated will be absorbed and will have no effect on the speed of the motor. However, as a balanced condition is approached, the voltage in the thermocouple circuit will be reduced and, as its value is diminished, the effect of the advancing E. M. F. will become apparent to reduce the speed and in effect anticipate the balance of the circuit and quickly bring the motor to rest.

It will be seen, therefore, that the advancing E. M. F. is effective to change the speed of the motor only when the change of a condition is small, or when the circuit has been balanced so that the potential difference therein is small.

Thus, by this construction, in any recording system where the galvanometer is at all times free and where balance is restored by the movement of a secondary device such as a reversible motor, as herein disclosed, high speed recording can be achieved. This construction also, as will be understood, tends to increase the accuracy of the recording made by the pointer 32, as the system rapidly attains equilibrium so that overshooting of the pointer with respect to the indicia of the scale chart is substantially eliminated.

In the modified form of the light control system, as shown in Figs. 2 and 3, the vibrating device comprises a moving coil 120 carrying a pair of angularly disposed mirrors 121 and 122. This construction obviates, as will be seen, the necessity of the shield intermediate the vibrating device and the photosensitive cell. The vibrating device is connected to the supply wires 51 and 52 in the same manner as that shown in connection with the preferred form of the invention, illustrated by Fig. 1, so that the coil 120 oscillates in step with the alternating current wave.

It will be seen, referring particularly to Fig. 2, that deflection of the galvanometer mirror in one direction will cause the light beam to be directed to the mirror 121, and the deflection of the mirror of the galvanometer in the opposite direction will cause the light beam to impinge against the mirror 122, however, as the mirrors 121 and 122 are angularly disposed with respect to one another, and as the coil 120 is energized by the same source of alternating current as are the thermionic devices, the light reflected by either of the mirrors 121 and 122 will be synchronized with the positive charges impressed on the plates of the thermionic devices.

It will be seen, therefore, that the light will strike the photosensitive cell at properly timed intervals so as to cause to function only one of the thermionic devices. The particular device chosen being according to the direction of deflection of the galvanometer and with off-zero deflection of the galvanometer, the light will not stroke the cell as the light reflected by the mirror 121 will be directed below the cell, and the light reflected by mirror 122 will be directed above the cell so that for practical purposes the light will be completely shut off from the cell.

Variations and modifications may be made within the scope of this invention and portions of the improvements may be used without others.

I claim:

1. In combination, a light-responsive means; a single light source; a deflectable member including means for controlling a light beam from said source; and means for periodically oscillating said light beam selectively in accordance with the direction of the deflection of the deflectable member to affect said light-responsive means so that periodic impulses are set up by the latter due to impingement of the light beam as it is caused to impinge upon said light-responsive means by deflection of the deflectable member, the impulses resulting from the deflection of said member in one direction being noncoincident with the impulses set up by deflection of the member in the other direction.

2. In combination, a light-responsive means; a single light source; a deflectable member including means for controlling a light beam from said source; and means including a light-directing member for directing the deflected beam in synchronism with an impressed alternating current for periodically oscillating the light beam selectively in accordance with the direction of deflection of the deflectable member to affect said light-responsive means so that periodic impulses are set up by the latter due to deflection of the deflectable member, the impulses resulting from said deflection of said member in one direction being noncoincident with the impulses set up by deflection of the member in the other direction.

3. A system for affecting a control in response to change in magnitude of a condition comprising means for producing an electric current and a circuit therefor; a light-responsive cell; a second circuit controlled by said cell; a single source of light; means responsive to changes in magnitude of said condition for controlling a beam of light emanating from said single source; means for oscillating said beam, which is controlled by said last-named means, for producing constant frequency pulsations in said beam having a phase position dependent upon the sense of change in the magnitude of said condition and for periodically directing said beam onto said cell, whereby there is produced a fluctuating current in said cell circuit which is phase displaced according to the sense of change in the condition; means for causing said current to selectively flow according to its phase position through one of a plurality of circuits; and electro-responsive means selectively traversed by the current for affecting a control.

4. A system for affecting a control in response to change in magnitude of a variable comprising current-producing means and a circuit therefor; a light-responsive cell; a single light source; means responsive to change in magnitude of said condition for controlling a beam of light from said source; means including an oscillatory light-directing member and a stationary perforated shield for producing constant frequency pulsations in said beam having a phase position dependent upon the sense of change in the magnitude of said condition, whereby there is produced a fluctuating current in said circuit which is phase displaced according to the sense of change in the condition; means for causing said circuit to selectively flow according to its phase position through one of a plurality of circuits; and electro-responsive means selectively traversed by the current for affecting a control.

5. A control apparatus comprising a single source of light; a light-sensitive cell; deflecting means responsive to change in magnitude of a condition for controlling a beam of light from said source; oscillating light-directing means for periodically directing said beam upon the light-sensitive cell for producing constant frequency pulsations in said beam having a phase position dependent upon the direction of deflection of said deflecting means with respect to a neutral position; and electrical control circuits connected to said light-sensitive cell for receiving the output of said cell when actuated by said beam.

6. A control apparatus comprising a single source of light; a light-sensitive cell; deflecting means responsive to change in magnitude of a condition for controlling a beam of light from said source; means for producing constant frequency pulsations in said beam having a phase position dependent upon the direction of deflection of said deflecting means with respect to a neutral position, said means including an oscillatory light-directing member for oscillating said beam and a perforated stationary shield disposed intermediate said light-sensitive cell and the oscillatory member, whereby the beam is selectively transmitted through said perforations to said cell depending upon the deflection of said deflecting means; and electric control circuits connected to said light-sensitive cell.

7. A control apparatus comprising a single source of light; a light-sensitive cell; deflecting means responsive to change in magnitude of a condition for controlling a beam of light from said source; means for directing said controlled beam of light to actuate said cell and for producing constant frequency pulsations in said beam having a phase position dependent upon the direction of deflection of said deflecting means with respect to a neutral position, said means including an oscillatory device having a pair of angularly disposed beam directing mirrors; and electrical control circuits connected to said light-sensitive cell.

8. In a potentiometer system, an adjustable slide wire and circuit therefor; means for adjusting the slide wire including an electro-responsive device operative in reverse directions;

control circuits connected with said device; a light-sensitive cell connected to said control circuits; a source of light; light deflecting means for controlling a beam of light from said source; means for deflecting said last-named means in either of opposite directions from a neutral position in response to unbalance in the slide wire circuit; periodically oscillated light directing means for periodically sweeping said deflected beam in a single plane; a shield in said plane provided with relatively spaced apertures, said shield being disposed intermediate said light-sensitive cell and said periodically oscillated means so that constant frequency pulsations are produced in said beam having a phase position dependent upon the direction of deflection of said light deflecting means with respect to the neutral position so that a pulsating current flows in the control circuits with a phase position corresponding to that of the pulsations in the light beam; means for selectively operating the electro-responsive device directionally according to the phase position of the pulsating current in said control circuits to adjust the slide wire; and means for introducing a countercurrent in said slide wire circuit proportional in magnitude to the magnitude of the current in said control circuit, whereby said deflecting means is deflected in a direction opposite to its direction of movement in response to unbalance in the slide wire circuit so that said deflecting means returns to the neutral position in advance of its return under normal balancing by operation of the electro-responsive means.

9. In a potentiometer system, an adjustable slide wire and circuit therefor; means for adjusting the slide wire including a reversible A. C. motor having a continuously energized field and oppositely disposed wire wound shading coils; control circuits connected with said shading coils; a light-sensitive cell connected to said control circuits; a source of light; means for directing a beam of light from said source upon the light-sensitive cell; a galvanometer connected in the slide wire circuit and operating said directing means to deflect the same in either of opposite directions from a neutral position in response to energy change in the slide wire circuit; means, including a perforated shield adjacent said light-sensitive cell and a periodically oscillated member periodically oscillating said light beam, for producing constant frequency pulsations in said beam having phase position dependent upon the direction of deflection of the galvanometer so that pulsating currents are set up in the control circuits having a phase position corresponding to that of the pulsations in the light beam; means for selectively controlling said shading coils to operate the motor directionally according to the phase position of the pulsating current in said control circuits to adjust the slide wire; and means including a current-producing means rendered operative by the motor as the same is directionally operated for introducing a counter current in said slide wire circuit dependent in magnitude and direction on the acceleration and direction of the movement of said motor, the introduction of said counter current causing said galvanometer to return said directing means to the neutral position in advance of its return by adjustment of the slide wire.

10. In a potentiometer system, an adjustable slide wire and circuit therefor; means for adjusting the slide wire including a reversible A. C. motor having a continuously energized field and oppositely disposed wire wound shading coils; control circuits connected with said shading coils; a light-sensitive cell connected to said control circuits; a source of light; means for directing a beam of light from said source upon the light-sensitive cell; a galvanometer connected in the slide wire circuit and operating said directing means to deflect the same in either of opposite directions from a neutral position in response to energy change in the slide wire circuit; means including a perforated shield adjacent said light-sensitive cell and a periodically oscillated member periodically oscillating said light beam for producing constant frequency pulsations in said beam having phase position dependent upon the direction of deflection of the galvanometer so that pulsating current in the control circuits have a phase position corresponding to that of the pulsations in the light beam; means for selectively controlling said shading coils to operate the motor directionally according to the phase position of the pulsating current in said control circuits to adjust the slide wire; and means including a current-producing means rendered operative by movement of said motor for introducing an advancing counter E. M. F. in said slide wire circuit, the direction and magnitude of said advancing counter E. M. F. being proportional to the magnitude and direction of the movement of said motor, the introduction of said advancing counter E. M. F. causing the galvanometer to respond to the energy change in the slide wire circuit and operating said light-directing means to cause the same to return to the neutral position in advance of its return by adjustment of the slide wire.

11. In a potentiometer system, an adjustable slide wire and circuit therefor; means for adjusting the slide wire including electro-responsive devices operative in reverse directions; control circuits connected with said device; a light-sensitive cell connected to said control circuits; a single source of light; light directing means; means for deflecting said directing means in either of opposite directions from the neutral position in response to energy change in the slide wire circuit; periodically oscillated light directing means; a shield provided with relatively spaced apertures, said shield being disposed intermediate said light-sensitive cell and said periodically oscillated means so that constant frequency pulsations are produced in said beam having phase position dependent upon the direction of deflection of said first light directing means with respect to the neutral position so that a pulsating current flows in the control circuits with a phase position corresponding to that of the pulsations in the light beam; means for selectively operating the electro-responsive devices directionally according to the phase position of the pulsating current in said control circuits to adjust the slide wire; and means rendered operative by the selective operation of said electro-responsive device for introducing a countercurrent to the slide wire circuit for controlling the movement of the means for deflecting said first-named directing means.

12. In a system for affecting a control in response to change in magnitude of a variable condition comprising a potentiometer including a slide wire; a contact associated therewith; a motor for moving said contact with respect to said slide wire; a light-responsive element; a single light source; a shield having a pair of spaced light passages therethrough intermediate said element and said light source; means for controlling the direction of the beam from said source in accordance with variations in the electrical condition of said potentiometer; periodically-operated means for selectively and periodically deflecting the said beam to illuminate the cell through one of said passages depending on the position of said last-named means; and means operated in timed relation with said periodically-operated means selectively controlling the operation of said motor in accordance with the illumination of the cell.

13. In a control apparatus, a single light source; a single deflectable member for controlling a beam of light from said source and movable from a normal position in response to a change in condition; an electro-responsive means movable in reverse directions; a single light sensitive cell; means for causing said cell to be energized in predetermined timed relation with the energization of the electro-responsive means in response to the beam of light controlled by said deflectable member for controlling the direction of movement of said electro-responsive means in response to movement of the deflectable member from a normal position, the direction of movement of the electro-responsive means being determined by the direction of deflection of said member from said normal position; and means rendered operative by movement of the electro-responsive means for directly modifying the movement of the deflectable member whereby the same is quickly returned to said normal position.

14. A system for affecting a control in response to change in magnitude of a condition, comprising means for producing an electric current; means for producing constant frequency fluctuations in said current and for phase displacing said current to a substantially quadrature position in response to change in the magnitude of said condition; a pair of electron emission devices connected to said current-producing means; means for energizing said devices in phase opposition to cause them to selectively respond to the phase positions of the fluctuating current; electro-responsive means connected with said devices and controlled according to the selected responses thereof; and means rendered operative by the controlled selective responses of said last-named means for assisting in the control in response to change in magnitude of the condition by directly decreasing the current produced by said first-named means, thereby decreasing the energization of said electron emission devices and the electro-responsive means controlled by said devices.

15. In a control apparatus, a deflectable member and an operating circuit therefor for controlling a beam of light, said member being movable from a predetermined position in response to a change in condition; an electro-responsive means movable in reverse directions; a single light-sensitive cell; means for causing said cell to be energized in predetermined timed relation with the energization of the electro-responsive means in response to the beam of light controlled by said deflectable member for controlling the direction of movement of said electro-responsive means in response to movement of the deflectable member from a predetermined position, the direction of movement of the electro-responsive means being determined by the direction of deflection of said member; and means rendered operative by movement of the electro-responsive means for modifying the movement of the electro-responsive means, said means including a counter current-producing means for supplying an opposing current in the operating circuit for said deflectable member, the magnitude and direction of which current is proportional to the direction and magnitude of movement of the electro-responsive means.

MANFRED J. JOHNSON.